US010263458B2

(12) United States Patent
Andrews et al.

(10) Patent No.: US 10,263,458 B2
(45) Date of Patent: Apr. 16, 2019

(54) UNINTERRUPTIBLE POWER SUPPLIES WITH CONTROL CAPABILITIES

(71) Applicant: Cooper Technologies Company, Houston, TX (US)

(72) Inventors: James Christopher Andrews, Mableton, GA (US); David Gavin Windsor, Raleigh, NC (US); Johnathan Michael Jackson, Raleigh, NC (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 57 days.

(21) Appl. No.: 15/237,021

(22) Filed: Aug. 15, 2016

(65) Prior Publication Data
US 2016/0380476 A1  Dec. 29, 2016

Related U.S. Application Data

(63) Continuation-in-part of application No. 15/098,909, filed on Apr. 14, 2016.
(Continued)

(51) Int. Cl.
F21S 9/02       (2006.01)
F21V 23/02      (2006.01)
F21V 23/00      (2015.01)
H02J 4/00       (2006.01)
H02J 9/06       (2006.01)
H02G 3/00       (2006.01)

(52) U.S. Cl.
CPC ............ H02J 9/061 (2013.01); F21S 9/022 (2013.01); F21V 23/003 (2013.01); F21V 23/02 (2013.01); H02J 4/00 (2013.01); H02J 9/065 (2013.01); H02G 3/00 (2013.01)

(58) Field of Classification Search
USPC ............................................. 307/24; 315/312
See application file for complete search history.

(56) References Cited

U.S. PATENT DOCUMENTS 6,198,250 B1   3/2001 Gartstein et al.
2007/0200433 A1  8/2007 Kelty
(Continued)

OTHER PUBLICATIONS

International Search Report for application No. PCT/US2016/027493 dated Jul. 14, 2016.

Primary Examiner — Rexford Barnie
Assistant Examiner — Xuan Ly
(74) Attorney, Agent, or Firm — King & Spalding LLP

(57) ABSTRACT

A distributed low voltage power system can include a primary power source that distributes line voltage power during a first mode of operation and fails to distribute the line voltage power during a second mode of operation. The system can also include a secondary power supply coupled to the primary power source, where the secondary power supply includes a controller and an energy storage device. The system can further include a power distribution module (PDM) coupled to the primary power source and the secondary power supply, where the PDM includes a first power transfer device and a first output channel. The system can also include at least one first LV device coupled to the first output channel of the PDM, where the at least one first LV device operates using a reserve LV signal based on the reserve signal during the second mode of operation.

20 Claims, 8 Drawing Sheets

Related U.S. Application Data

(60) Provisional application No. 62/147,199, filed on Apr. 14, 2015.

(56) References Cited

U.S. PATENT DOCUMENTS

| | | | |
|---|---|---|---|
| 2008/0197790 A1* | 8/2008 | Mangiaracina | F21S 9/022 315/312 |
| 2010/0244573 A1 | 9/2010 | Karnick et al. | |
| 2012/0280673 A1* | 11/2012 | Watanabe | H02J 3/1885 323/304 |
| 2013/0328397 A1* | 12/2013 | Lee | H02J 3/32 307/23 |
| 2014/0001977 A1* | 1/2014 | Zacharchuk | H04L 12/2816 315/291 |
| 2014/0183949 A1 | 7/2014 | Murano | |
| 2015/0081127 A1* | 3/2015 | Bhageria | H02J 4/00 700/295 |
| 2015/0180230 A1 | 6/2015 | Xu | |

* cited by examiner

UNINTERRUPTIBLE POWER SUPPLIES WITH CONTROL CAPABILITIES

CROSS-REFERENCE TO RELATED APPLICATIONS

This application is a continuation-in-part application of and claims priority to U.S. patent application Ser. No. 15/098,909, entitled "Hybrid Distributed Low Voltage Power Systems" and filed on Apr. 14, 2016, which itself claims priority under 35 U.S.C. § 119 to U.S. Provisional Patent Application Ser. No. 62/147,199, titled "Hybrid Distributed Low Voltage Power Systems" and filed on Apr. 14, 2015, both of which are hereby incorporated herein by reference in their entirety.

TECHNICAL FIELD

Embodiments described herein relate generally to uninterruptible power supplies, and more particularly to systems, methods, and devices for uninterruptible power supplies with control capabilities.

SUMMARY

In general, in one aspect, the disclosure relates to a distributed low voltage power system. The distributed low voltage power system can include a primary power source that distributes line voltage power during a first mode of operation and fails to distribute the line voltage power during a second mode of operation. The distributed low voltage power system can also include a secondary power supply coupled to the primary power source, where the secondary power supply includes a controller and an energy storage device, where the controller receives an input signal during the first mode of operation, stores the input signal as a reserve signal in the energy storage device during the first mode of operation, and distributes the reserve signal during the second mode of operation. The distributed low voltage power system can further include a power distribution module (PDM) coupled to the primary power source and the secondary power supply, where the PDM includes a first power transfer device and a first output channel, where the PDM receives the line voltage power from the primary power source during the first mode of operation, and where the first power transfer device generates a first low-voltage (LV) signal using the line voltage power during the first mode of operation. The distributed low voltage power system can also include at least one first LV device coupled to the first output channel of the PDM, where the at least one LV device operates using the first LV signal generated by the PDM during the first mode of operation, and where the at least one first LV device operates using a reserve LV signal based on the reserve signal during the second mode of operation.

In another aspect, the disclosure can generally relate to a secondary power source. The secondary power source can include at least one input channel configured to receive an input signal from a power source. The secondary power source can include an energy storage device coupled to the at least one input channel, where the energy storage device stores the input signal, where the energy storage device converts the input signal to a reserve signal. The secondary power source can also include at least one output channel that receives the reserve signal from the energy storage device, where the at least one output channel is configured to deliver the reserve signal to at least one component of a low voltage (LV) power distribution system. The secondary power source can further include a controller that controls the flow of the input signal from the at least one input channel to the energy storage device and the flow of the reserve signal from the energy storage device to the at least one output channel. The controller can be configured to control delivery of the reserve signal to at least one LV device when the input signal ceases being delivered to the at least one input channel.

These and other aspects, objects, features, and embodiments will be apparent from the following description and the appended claims.

BACKGROUND

Some low voltage distributed power systems can include a secondary source of power that provides power to one or more devices (e.g., light-emitting diode (LED) light fixtures) when a primary source of power is unavailable. Such systems can be called low voltage distributed power systems.

BRIEF DESCRIPTION OF THE DRAWINGS

The drawings illustrate only example embodiments of distributed low voltage power systems and are therefore not to be considered limiting of its scope, as distributed low voltage power systems may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1A:
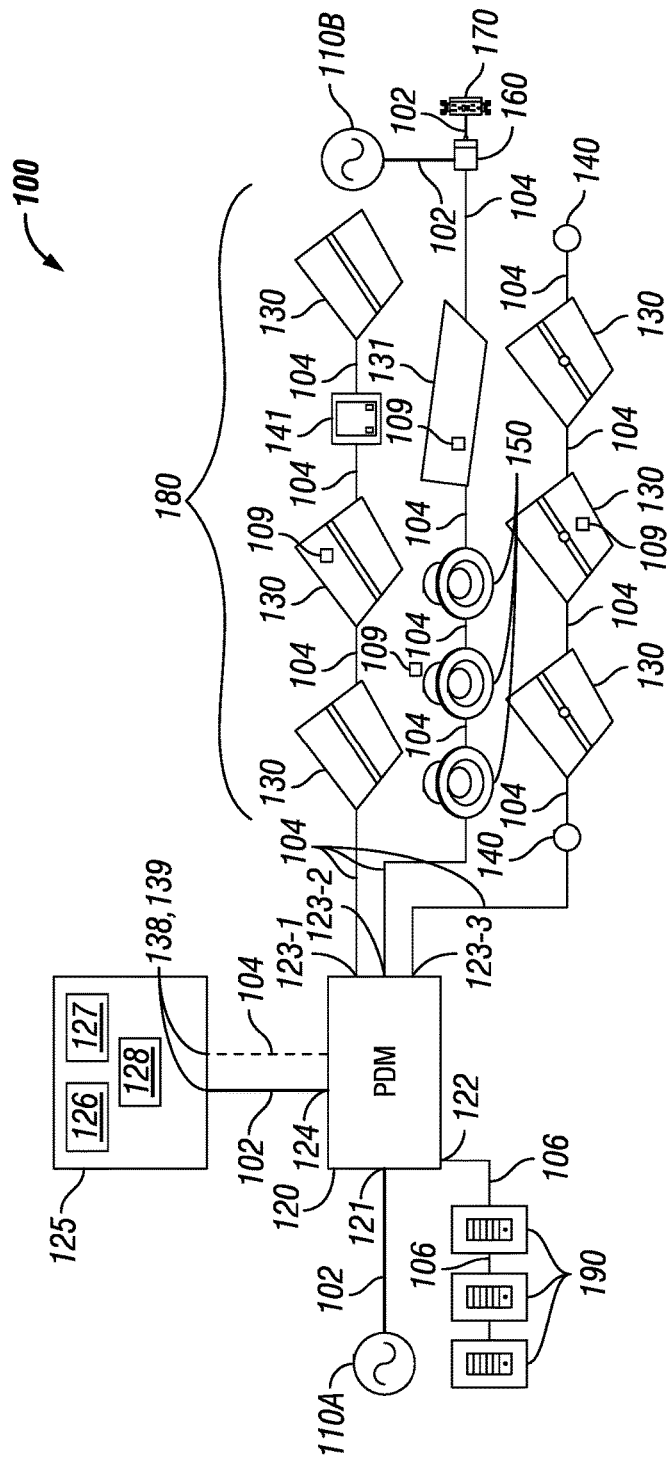
FIGS. 1A and 1B show a system diagram of a distributed low voltage power system in accordance with certain example embodiments.

The example embodiments discussed herein are directed to systems, apparatuses, and methods of secondary power supplies (sometimes called uninterruptible power supplies or UPSs herein) with control capabilities. While example embodiments described herein are directed to use with lighting systems, example embodiments can also be used in systems having other types of devices. Examples of such other systems can include, but are not limited to, security systems, fire protection systems, emergency management systems, and assembly systems. Thus, example embodiments are not limited to use with lighting systems.

Example embodiments can be used with one or more of any number of low voltage system infrastructures. For instance, example embodiments can use Ethernet cables coupled to output channels of a Power-Over-Ethernet (POE) switch, where the PDM (defined below) acts as the POE switch. As an alternative to this example, the example secondary power supply can act as the POE switch. As another example, the example secondary power supply (or a PDM coupled to the secondary power supply) can serve as a gateway, where multiple devices are connected to the output channels of the secondary power supply and/or PDM. In this way, the secondary power supply or the PDM can act as a point-of-load (POL) controller, described below. As yet another example, the example secondary power supply (or a PDM coupled to the secondary power supply) can act as a gateway, which in turn can cause the POL or the PDM to act as a POL controller.

As defined herein, a mode of operation is defined by certain factors existing or not existing and/or by certain components of an example system described herein operating or not operating. For example, a first mode of operation can be defined when a primary power supply delivers line voltage power, and a second mode of operation can be defined when the primary power source fails to deliver line voltage power. As another example, a first mode of operation can be defined during "off peak" hours when power prices are relatively low, and a second mode of operation can be defined during "peak" hours when power prices are relatively high.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In certain example embodiments, the secondary power supplies with control capabilities (or portions thereof) described herein meet one or more of a number of standards, codes, regulations, and/or other requirements established and maintained by one or more entities. Examples of such entities include, but are not limited to, Underwriters' Laboratories (UL), the Institute of Electrical and Electronics Engineers (IEEE), and the National Fire Protection Association (NFPA). For example, wiring (the wire itself and/or the installation of such wire) that electrically couples an example PDM (defined below) with a device may fall within one or more standards set forth in the National Electric Code (NEC). Specifically, the NEC defines Class 1 circuits and Class 2 circuits under various Articles, depending on the application of use. As another example, UL924 establishes standards for emergency power lighting systems. As yet another example, NFPA 101 establishes standards and protocols during power outages.

Class 1 circuits under the NEC typically operate using line voltages (e.g., between 120 V alternating current (AC) and 600 VAC). The wiring used for Class 1 circuits under the NEC must be run in raceways, conduit, and enclosures for splices and terminations. Consequently, wiring for Class 1 circuits must be installed by a licensed electrical professional. By contrast, Class 2 circuits under the NEC typically operate at lower power levels (e.g., up to 100 VAC, no more than 60 V DC). The wiring used for Class 2 circuits under the NEC does not need to be run in raceways, conduit, and/or enclosures for splices and terminations. Specifically, the NEC defines a Class 2 circuit as that portion of a wiring system between the load side of a Class 2 power source and the connected equipment. Due to its power limitations, a Class 2 circuit is considered safe from a fire initiation standpoint and provides acceptable protection from electrical shock. Consequently, wiring for Class 2 circuits may not need to be installed by a licensed electrical professional.

As another example, the International Electrotechnical Commission (IEC) sets and maintains multiple standards and categorizations of electrical supply for a system. One such categorization is separated or safety extra-low voltage (SELV), which is an electrical system in which the voltage cannot exceed 25 V AC RMS (root-mean-square) (35 V AC peak) or 60 V DC under dry, normal conditions, and under single-fault conditions, including earth faults in other circuits. Another such categorization is protected extra-low voltage (PELV), which is an electrical system in which the voltage cannot exceed 25 V AC RMS (root-mean-square) (35 V AC peak) or 60 V DC under dry, normal conditions, and under single-fault conditions, except earth faults in other circuits. Yet another such categorization is functional extra-low voltage (FELV), which is an electrical system in which the voltage cannot exceed 25 V AC RMS (root-mean-square) (35 V AC peak) or 60 V DC under normal conditions.

As defined here, the term "low voltage" can be a level of voltage that is suitable for use in a Class 2 circuit. Example embodiments of secondary power supplies with control capabilities can be used to provide power to one or more low voltage (LV) devices (defined below) that are part of a Class 2 circuit. In addition, or in the alternative, example secondary power supplies with control capabilities can be used to provide power to one or more devices that are part of a Class 1 circuit.

Example embodiments of secondary power supplies with control capabilities will be described more fully hereinafter with reference to the accompanying drawings, in which example embodiments of secondary power supplies with control capabilities are shown. Secondary power supplies with control capabilities may, however, be embodied in many different forms and should not be construed as limited to the example embodiments set forth herein. Rather, these example embodiments are provided so that this disclosure will be thorough and complete, and will fully convey the scope of secondary power supplies with control capabilities to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation. Also, the names given to various components described herein are descriptive of one or more embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

Figure 1B:
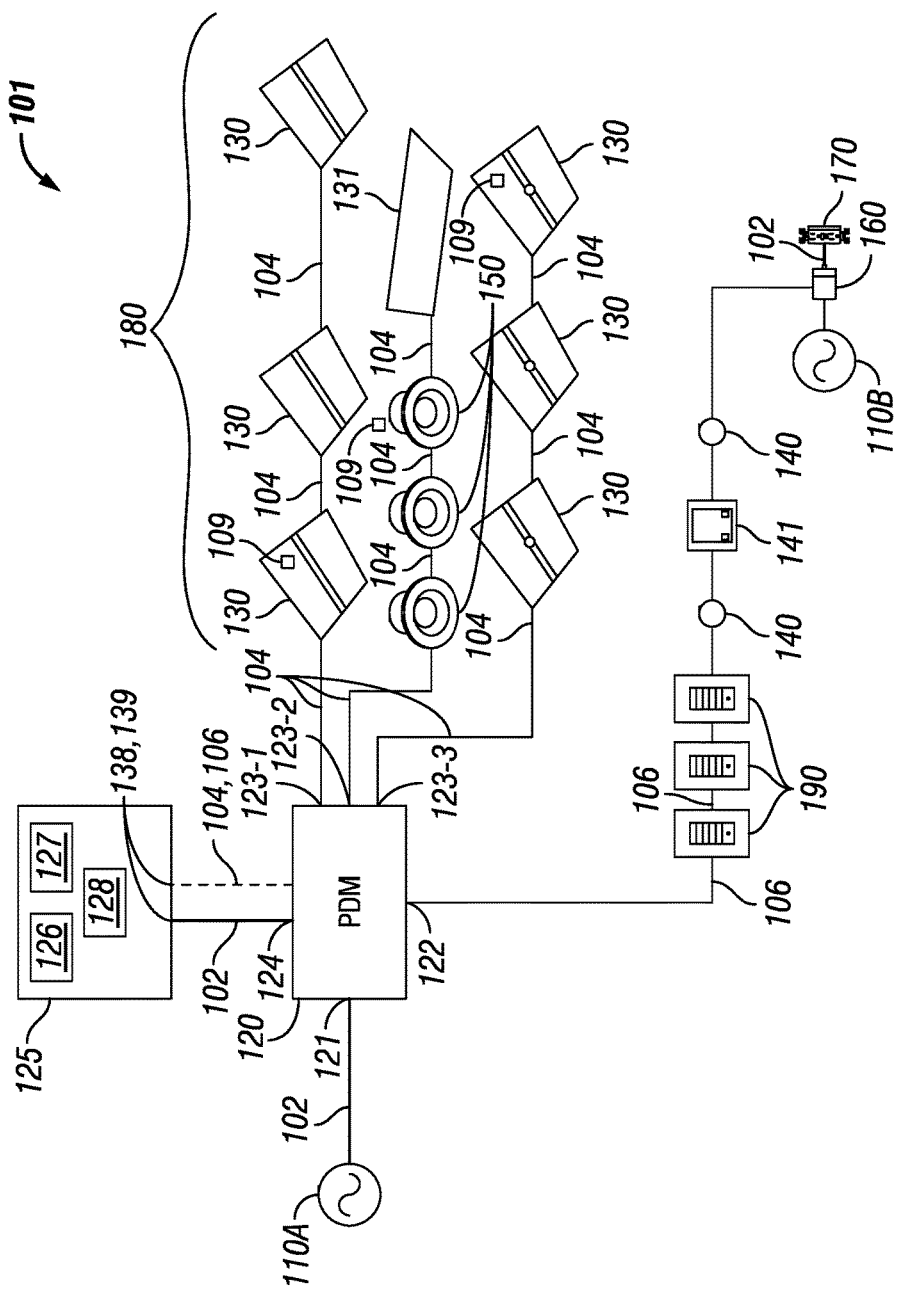

FIGS. 1A and 1B each shows a system diagram of a distributed power system 100 and system 101, respectively, in accordance with certain example embodiments. The system 100 of FIG. 1A and the system 101 of FIG. 1B includes, in varying degrees of configuration, at least one (in this case, two) primary power source 110, at least one power distribution module 120 (PDM 120), at least one secondary power supply 125 (also called an uninterruptible power supply 125 (UPS 125) and a storage device 125), at least one (in this case, seven) troffer light 130, at least one (in this case, three) can light 150, at least one (in this case, one) sensing device 140 (e.g., motion sensor), at least one (in this case, one) inverter 160, at least one (in this case, one) wall outlet 170, at least one (in this case, one) photocell/timer 141, and at least one (in this case, three) external controller 190. An external controller 190 can also be called by other names, including but not limited to a master controller 190 and a network manager 190. An external controller 190 can be coupled to any of a number of PDMs and/or other components in any of a number of systems.

Operational components of system 100, system 101, or any system described herein, such as the troffer lights 130, the can lights 150, and the sensing devices 140, are referred to generally herein as LV devices 180 (also called "devices" or "downstream devices"). As defined herein, a LV device 180 can be any device coupled to an output channel of the PDM 120 and/or the secondary power supply 125 to receive LV signal from the PDM 120 and/or the secondary power supply 125. In this case, the LV devices 180 include the troffer lights 130, the can lights 150, the controllers 190, the inverter 160, the wall outlet 170, the photocell/timer 141, and the sensing device 140. Other examples of a LV device 180 can include, but are not limited to, cloud storage, a mobile device, a local area network (LAN), a wide area network (WAN), a window shade control device, a thermostat, a computing device, a printing device, and an exit sign. In certain example embodiments, the LV devices 180 of system 100 and system 101 receive power from the PDM 120 when the primary power source 110 is functioning, and the LV devices 180 receive power from at least one secondary power supply 125 when the primary power source 110 is not functioning (e.g., during a power outage).

Each of these components of the system 100 and system 101 are electrically coupled to at least one other component of the system 100 and system 101 using wired and/or wireless technology. For example, primary power source 110A and primary power source 110B are coupled to the PDM 120 and the inverter 160, respectively, by one or more line voltage cables 102. As another example, the secondary power supply 125 is coupled to at least one troffer light 130 using one or more low voltage (LV) links 104. As yet another example, the PDM 120 can be coupled to the external controller 190 using one or more communication links 106. Each of these wired wireless technologies will be discussed below in more detail.

A sensing device 140 can be any LV device 180 that detects one or more conditions (e.g., motion, light, sound). Examples of a sensing device 140 can include, but are not limited to, a photocell, a motion detector, an audio detector, a pressure detector, a temperature sensor, and an air flow sensor. The controller 190 can one or more of the other LV devices 180 in the system 100. In some cases, the controller 190 can be considered a LV device 180. Examples of a controller 190 can include, but are not limited to, a thermostat, a dimmer switch, a control switch, a control panel, and a power switch.

The controller 190 of FIGS. 1A and 1B can communicate with (e.g., send instructions to, receive data about one or more LV devices 180 from) the PDM 120 and/or the secondary power supply 125). Instructions sent by the controller 190 to the PDM 120 and/or the secondary power supply 125 can affect the operation of all LV devices 180 coupled to one or more particular channels of the PDM 120 and/or the secondary power supply 125, particular LV devices 180 coupled to one or more particular channels of the PDM 120 and/or the secondary power supply 125, or any combination thereof. Communication between the PDM 120, the secondary power supply 125, the controller 190, and the controllers in one or more LV devices 180 of the system 100 can include the transfer (sending and/or receiving) of data. Communications between the PDM 120, the secondary power supply 125, the controller 190, and/or a LV device 180 (e.g., the troffer lights 130, the can lights 150, the controller 190) can be made through the LV links 104 and/or the communication link 106, using wired and/or wireless technology.

Such data can include instructions, status reports, notifications, and/or any other type of information. Specific examples of data and/or instructions sent between the PDM 120, the secondary power supply 125, the controller 190, and/or a LV device 180 (e.g., the troffer lights 130, the can lights 150, the controller 190, the sensing device 140) can include, but are not limited to, delivery of power signals (e.g., LV signals) to one or more LV devices 180, a light level, a light fade rate, a demand response, instructions to turn on, instructions to turn off, occupancy of an area, detection of daylight, a security override, a temperature, a measurement of power, a measurement or calculation of power factor, operational status, a mode of operation, a dimming curve, a color and/or correlated color temperature (CCT), a manual action, manufacturing information, performance information, warranty information, air quality measurements, upgrade of firmware, update of software, position of a shade, and a device identifier.

Each primary power source 110 (e.g., primary power source 110A, primary power source 110B) generates and/or delivers, directly or indirectly, electrical power that is a higher voltage and/or a different type (e.g., direct current, alternating current) of voltage than the voltage ultimately used by the various LV devices 180 (e.g., light troffers 130, can lights 150, sensing devices 140) in the system 100. The power generated or delivered by the primary power source 110 can be called line voltage power or input power. The line voltage power can be power that is delivered to a house, building, or other similar structure that supplies electricity located within or proximate to such structure.

A primary power source 110 can also generate DC power. Examples of voltages generated by a primary power source 110 can include 120 VAC, 240 VAC, 277 VAC, 24 VDC, 480

VDC, and 480 VAC. If the line voltage power is AC power, the frequency can be 50 Hz, 60 Hz, or some other frequency. Examples of a primary power source 110 can include, but are not limited to, a battery, a photovoltaic (PV) solar panel, a wind turbine, a power capacitor, an energy storage device, a power transformer, a fuel cell, a generator, and a circuit panel. As defined herein, a line voltage includes any of a number of voltages that is typically at least as great as the maximum LV signal (described below), and that is typically a nominal service voltage such as 120 VAC, 277 VAC, or 480 VDC.

The line voltage power is sent, directly or indirectly, from a primary power source 110 to one or more other components (e.g., a PDM 120, the secondary power supply 125) of the system 100 and the system 101 using the line voltage cables 102. The line voltage cables 102 can include one or more conductors made of one or more electrically conductive materials (e.g., copper, aluminum). The size (e.g., gauge) of the line voltage cables 102 (and/or conductors therein) are sufficient to carry the line voltage power of the primary power source 110. Each line voltage cable 102 may be coated with an insulator made of any suitable material (e.g., rubber, plastic) to keep the electrical conductors electrically isolated from any other conductor in the line voltage cable 102. In some cases, LV links 104 and/or communication links 106 can be used to facilitate transfer of line voltage power form a primary power source 110 to the secondary power supply 125.

In certain example embodiments, one or more of the LV devices 180 (in this case, the light troffers 130, the can lights 150, the sensing device 140, and the controller 190) in the system 100 and system 101 use an amount and/or type (e.g., DC, AC) of power that is different from the amount and type of line voltage power generated by a primary power source 110. For example, the line voltage power generated by a primary power source 110 can be AC power, and the LV devices 180 of the system 100 and system 101 require DC power to operate. In such a case, the PDM 120 and/or the secondary power supply 125 can be used between the primary power sources 110 and the LV devices 180. In this way, the PDM 120 and/or the secondary power supply supply 125 can convert the input power (the line voltage power) to low-voltage (LV) power (also called a LV signal), where the LV power can be used by the various downstream LV devices 180. As defined herein, a LV signal has a voltage that does not exceed approximately 42.4 VAC (root mean square) or 60 VDC.

In the system 100 shown in FIG. 1A and the system 101 of FIG. 1B, the portions of the system 100 and the system 101 that involve the LV power are classified as a "safe" system under currently-existing standards and/or regulations. For example, the LV power portions of the system 100 and system 101 can be considered a NEC Class 2 system. As another example, the LV power portions of the system 100 and system 101 can be considered free from risk of fire and/or electrical shock.

In many typical systems known in the art, one or more of the downstream LV devices 180 (e.g., troffer light 130, can light 150, sensing device 140) can include a power transfer device because such LV devices 180 receive the input power (or other power) from a component (e.g., primary power source 110A) of the system 100 and system 101 where the power is of a type and/or amount that is different from that of the power used by the LV device 180. Using example embodiments, the downstream LV devices 180 may not require a power transfer device because the power that each of these LV devices 180 receive is LV power (also called a LV signal) in a type and amount (e.g., 100 W, 48 VDC) used by such LV devices 180.

In certain example embodiments, as shown in FIGS. 1A and 1B, one or more of the LV devices 180 can include or be coupled to a power transfer device that receives the LV signal and generates, using the LV signal, a level and type of power used by the LV device 180. As a result, such LV devices 180 can have a point-of-load POL controller 109 (also called, for example, a driver or a ballast). The POL controller 109 is usually located within a housing of the LV device 180 and is designed to receive a LV signal. When a LV signal is received by the POL controller 109, the POL controller 109 provides power regulation and control to the LV device 180. In other words, a POL controller 109 can perform one or more of a number of functions. Such functions can include, but are not limited to, receiving instructions (as from the PDM 120 and/or the secondary power supply 125), collecting and recording operational data, recording communications with the PDM 120, the secondary power supply 125, and/or other devices, and sending operational data to the PDM 120, the secondary power supply 125, and/or other devices.

The example downstream LV devices 180 (e.g., the troffer lights 130, the can lights 150, the controllers 190, the sensing device 140, the inverter 160, the wall outlet 170, the photocell/timer 141) shown in FIGS. 1A and 1B and described herein are not meant to be limiting. Examples of other LV devices 180 that can receive and use (directly or indirectly) LV signals from the PDM 120 and/or the secondary power supply 125 can include, but are not limited to, a power source (e.g., a LED driver, a ballast, a buck converter, a buck-boost converter), a controller (e.g., a pulse width modulator, a pulse amplitude modulator, a constant current reduction dimmer), a keypad, a touchscreen, a dimming switch, a thermostat, a shade controller, a universal serial bus charger, and a meter (e.g., water meter, gas meter, electric meter).

The LV devices 180 (in this case, the troffer lights 130, the can lights 150, the controllers 190, the inverter 160, the wall outlet 170, the photocell/timer 141, and the sensing device 140) of FIGS. 1A and 1B are each electrically coupled, directly or indirectly, to the PDM 120 and, at least in some cases, at least one secondary power supply 125. The PDM 120 of FIGS. 1A and 1B is electrically coupled to the primary power source 110 using the line voltage cable 102. The PDM 120 can include a power transfer device that generates, using the power delivered by the primary power source 110, one or more of a number of LV signals for some or all of the other LV devices 180 (e.g., the troffer lights 130, the can lights 150, the sensing device 140) and the secondary power supply 125 in the system 100 and system 101. Examples of a power transfer device can include, but are not limited to, a transformer, an inverter, and a converter. The PDM 120 can have an input portion, an output portion, and the power transfer device. The power transfer device of the PDM 120 can be essentially the same as the power transfer device described above for each of the downstream LV devices 180 in the system 100 of FIG. 1A and system 101 of FIG. 1B.

In certain example embodiments, the PDM 120 includes one or more (in this case, one) input channels 121 that receive the line voltage power from one or more primary power sources 110. The PDM 120 can also include one or more (e.g., one, two, five, ten) output channels 123, where each output channel 123 (also called an outlet channel) of the PDM 120 delivers a LV signal for use by one or more LV devices 180 that are electrically coupled to that output channel 123 of the PDM 120.

The amount and/or type of power of the LV signal of one output channel can be substantially the same as, or different than, the amount and/or type of power of the LV signal of another output channel 123 of the PDM 120. For example, each output channel 123 of the PDM 120 can output 100 W, 48 VDC of power (also called the LV signal). The LV signals delivered by an output channel 123 of the PDM 120 can be at a constant level and/or a variable level. The LV signals can change a state (e.g., on, off, dim, standby) of one or more LV devices 180. In addition, or in the alternative, the LV signal can include transferred data (e.g., instructions, requests, information, status).

There can be other channels of the PDM 120 that can serve as input channels and/or output channels. For example, in this case, the PDM 120 includes one or more channels 122 that are coupled to one or more controllers 190 and/or other LV devices 180, as described below. As another example, also in this case, the PDM 120 includes one or more channels 124 that are coupled to and receive reserve line voltage from one or more secondary power sources 125, also as described below.

In certain example embodiments, such as the system 100 of FIG. 1A, one or more LV cables 104 are used to electrically couple, directly or indirectly, one or more of the LV devices 180 (e.g., the troffer lights 130, the can lights 150, the sensing device 140) and the secondary power supply 125 in the system 100 and the system 101 to the PDM 120. The LV cables 104 can have one or more pairs of conductors. Each pair of conductors of the LV cable 104 can deliver LV signals that represent power signals and/or communication signals. In some cases, a LV cable 104 has at least one pair of conductors that carries power signals and at least one pair of conductors that carries control signals. The LV cables 104 can be plenum rated. For example, one or more of the LV cables 104 can be used in drop ceilings without conduit or cable trays.

The PDM 120 can also have a communication link 106 with one or more controllers 190, the secondary power supply 125, and/or one or more of the LV devices 180. In the examples of FIGS. 1A and 1B, the communication link 106 is coupled to channel 122 of the PDM 120. The communication link 106 can be LV cable, Ethernet cable, a RS45 cable, and/or some other wired technology. In addition, or in the alternative, the communication link 106 can be a network using wireless technology (e.g., Wi-Fi, Zigbee, 6LoPan). As described below, one or more communication links 106 can also be coupled to one or more output channels 123 of the PDM 120, so that the communication links 106, in place of the LV cables 104, deliver LV power and/or control to the secondary power supply 125 and/or one or more of the LV devices 180.

The controller 190 can be communicably coupled to one or more other systems in addition to the system 100 and the system 101. Similarly, the PDM 120 can be coupled to one or more other PDMs in one or more other systems. The system 100 and the system 101 can have multiple PDMs 120, where each PDM 120 provides LV power and communicates (sends and receives data) with one or more devices (e.g., a secondary power supply 125).

In some cases, such as with the system 101 of FIG. 1B, a controller 190 can be coupled to one or more other components of the system 101 using communication link 106. Examples of such other components can include, but are not limited to, one or more LV devices 180 (in the case of FIG. 1B, sensing devices 140, photocell/timer 141, and inverter 160). As yet another alternative, one or more components (e.g., sensing devices 140, photocell/timer 141, and inverter 160) of a system (e.g., system 100, system 101) can interface with other components of the system through a low voltage control interface rather than a direct connection to each so that existing low voltage components (e.g., LV devices 180) can be used.

In certain example embodiments, the PDM 120 can include communication and diagnostic capabilities. Communications can be with the controller 190, one or more secondary power supplies 125, one or more downstream LV devices 180, other PDMs 120 in the system 100 and/or the system 101, a user device, and/or any other component of the system 100 and/or the system 101. Diagnostic capabilities can be for operations of the system 100 and/or the system 101 overall, for operations of the PDM 120, for operations of one or more devices (e.g., secondary power supply 125) coupled to the PDM 120, for operations of one or more other PDMs in the system 100 and/or the system 101, and/or for any other components of the system 100 and/or the system 101.

Each secondary power supply 125 of FIGS. 1A and 1B can be electrically coupled to one or more of a number of components of the system 100 and/or the system 101. For example, as shown in FIGS. 1A and 1B, the secondary power supply 125 can be electrically coupled to the PDM 120. Specifically, the secondary power supply 125 of FIGS. 1A and 1B is coupled to channel 124 of the PDM 120. A secondary power supply 125 can be electrically coupled to another component (e.g., the PDM 120, one or more LV devices 180, a controller 190) of the system 100 and/or the system 101 using wired and/or wireless technology. For example, in this case, the secondary power supply 125 can be electrically coupled to the channel 124 of the PDM 120 using a line voltage cable 102 or, optionally, a LV cable 104. Any power delivered by a secondary power supply 125 can be called reserve power.

In certain example embodiments, the secondary power supply 125 serves only to store power that it receives when the PDM 120 and/or the primary power source 110 is functioning. The secondary power supply 125 can include one or more of a number of components. For example, as shown in FIGS. 1A and 1B, the secondary power supply 125 can include a controller 127, one or more energy storage devices 126, and a power transfer device 128. The secondary power supply 125 can receive line voltage power from the PDM 120 and store the line voltage power as reserve power in one or more energy storage devices 126, described below. At a later time (e.g., when the primary power source 110 stops delivering primary power, as during a power outage), the secondary power supply 125 can then release the reserve power through the line voltage cable 102 back to the PDM 120, to one or more LV devices 180, and/or to one or more other components of the system 100.

Alternatively, the secondary power supply 125 can receive LV signals from the PDM 120 and store the LV signals as reserve power in the one or more energy storage devices 126. At a later time, the secondary power supply 125 can then release the stored LV signals as reserve power (e.g., through the LV cable 104, through a communication link 106) back to the PDM 120 and/or to one or more LV devices 180. In this way, the secondary power supply 125 can provide reserve power to the PDM 120 and/or to one or more LV devices 180 in lieu of the primary power provided by the primary power source 110A.

The energy storage device 126 of the secondary power supply 125 can accumulate, store, and release energy for use by another component (e.g., the PDM 120, one or more LV devices 180, a controller 190) of the system 100. Examples of an energy storage device 126 can include, but are not limited to, a battery, a fuel cell, a hot water storage tank, a steam accumulator, a hydraulic accumulator, a flywheel, a supercapacitor, an ultracapacitor, and a capacitor. If the energy storage device 126 includes a battery, the battery technology can vary, including but not limited to lithium ion, lead/acid, solid state, graphite anode, titanium dioxide, nickel cadmium, nickel metal hydride, nickel iron, and lithium polymer. In certain example embodiments, the energy storage device 126 of a secondary power supply 125 can be removable and replaceable.

The energy storage device 126 can also provide energy to operate one or more of the other modules (e.g., the controller 427 and the power transfer device 428, both described below with respect to FIG. 4) of the secondary power supply 125. A secondary power supply 125 can have one or multiple energy storage devices 126 that can be networked with and/or independent of each other. In the latter case, each energy storage device 126 can be the same as or different than each other. The energy storage device 126 can have a capacity, which represents the maximum amount of power that the energy storage device 126 can store at a given time. The power stored by the energy storage device 126 of the secondary power supply 125 can be the line voltage power (or other power received by the input portion of the secondary power supply 125) and/or a LV signal.

The energy storage device 126 of the secondary power supply 125 can have a variable charge rate. In other words, the power received in the energy storage device 126 can be stored at different rates. These different rates of storing power in the energy storage device 126 can vary based on one or more of a number of factors, including but not limited to a user setting, a level and type of power, a time of day, a current level of charge relative to the capacity of the energy storage device 126, a default setting, an amount of time charging, and whether a storage threshold has been met. Storing and discharging power by the secondary power supply 125 can be called modes of operation herein.

Figure 2:
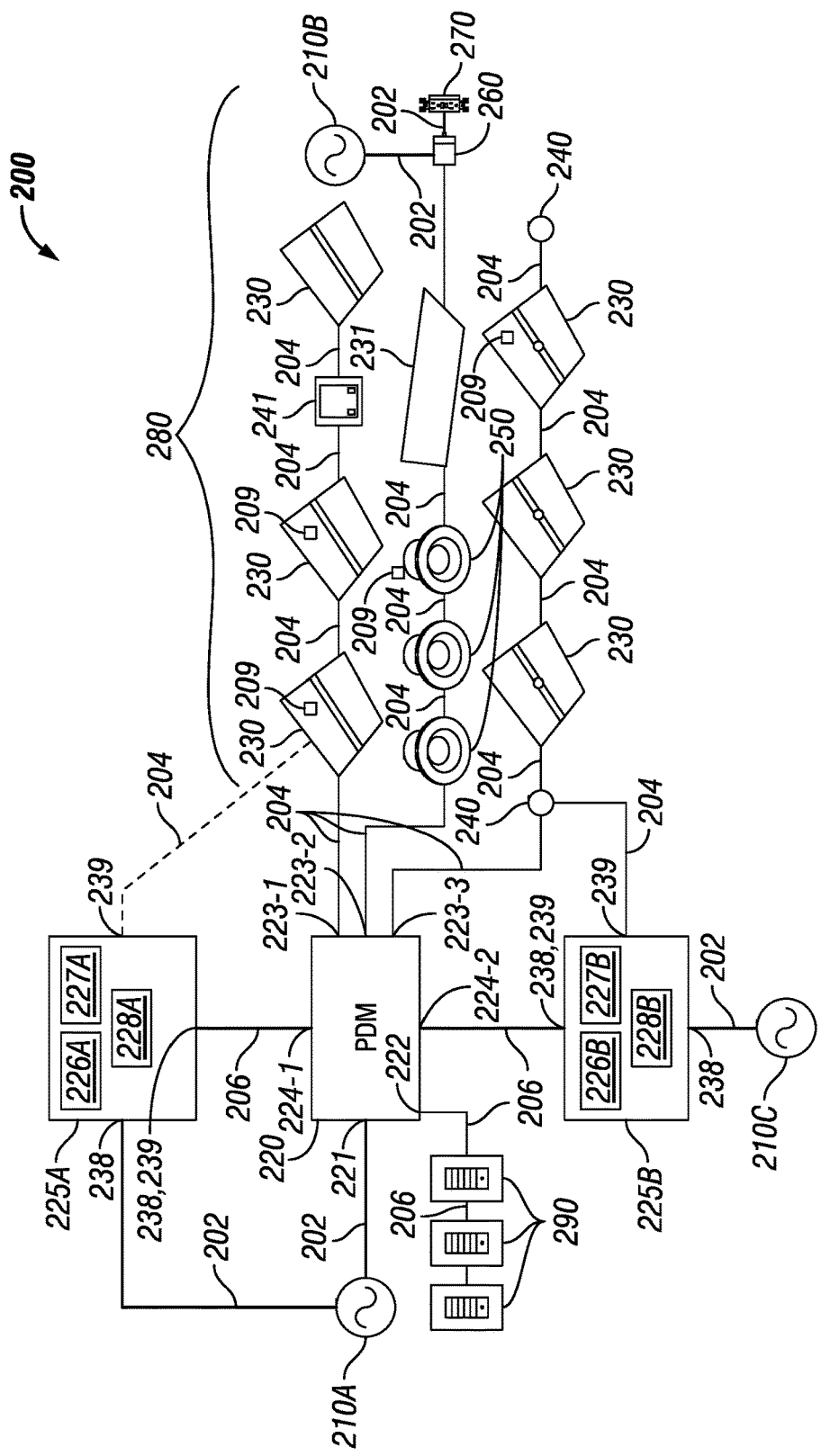
FIG. 2 shows a system diagram of another distributed low voltage power system in accordance with certain example embodiments.

In certain example embodiments, as shown in FIG. 2 below, the secondary power supply 125 receives power (e.g., input power) from one component (e.g., primary power source 110, PDM 120) of the system (e.g., system 100, system 101), generates one or more of a number of reserve signals based on the power received, and sends the reserve signals to one or more other LV devices 180 (e.g., troffer lights 130, can lights 150, sensing device 140) in the system. Consequently, the secondary power supply 125 can have an input portion, an output portion, and an optional power transfer device 128. The power transfer device 128 of the secondary power supply 125 can be essentially the same as the power transfer device described above with respect to the PDM 120. In some cases, such as shown in FIGS. 1A and 1B, the input portion and the output portion of the secondary power supply 125 can share the same connection point.

In certain example embodiments, the input portion of the secondary power supply 125 receives (directly or indirectly) line voltage power from the primary power source 110. An example of how the secondary power supply 125 receives line voltage power is shown in FIGS. 1A and 1B, where line voltage power is generated by the primary power source 110, sent to the PDM 120 at input channel 121, and the PDM 120 sends the line voltage power through channel 124 to the input portion of the secondary power supply 125.

In certain example embodiments, the energy storage device 126 of the secondary power supply 125 can intelligently store power to prolong the useful life of the energy storage device 126 of the secondary power supply 125. For example, the secondary power supply 125 can include a controller 127 that is coupled to the energy storage device 126. In such a case, the controller 127 can control the energy storage device 126 based on one or more storage thresholds (in other words, levels of power storage of the energy storage device 126 relative to the capacity of the energy storage device 126). For example, the controller 127 can prevent the energy storage device 126 from accepting additional power when the energy storage device 126 is at 95% of capacity (corresponding, for example, to a high storage threshold), and the controller 127 can allow the energy storage device 126 to accept additional power when the energy storage device 126 is at 25% of capacity (corresponding, for example, to a low storage threshold).

As a specific example, a controller 127 can allow the energy storage device 126 to output the power stored to the output of the secondary power supply 125 to be sent to the downstream device through the PDM 120 between 10:00 p.m. and 6:00 a.m., and the controller 127 can prevent the energy storage device 126 to output the power stored to the output of the secondary power supply 125 at all other times, except when the primary power source 110 is unavailable (e.g., is in an outage).

The controller 127 can also perform other functions that affects the operation of other components (e.g., the LV devices 180, the controller 190) in the system 100. For example, when the secondary power supply 125 is providing LV signals because the primary power source 110 and/or the PDM 120 has failed (e.g., is not providing power within the system 100), the controller 127 can lock out one or more of the controllers 190 in the system 100. In this way, certain controls of the LV devices 180 that could normally be used when the primary power source 110 is in service are unusable when the primary power source 110 is not providing power.

As an example, if the primary power source 110 is out of service, and so one or more of the LV devices 180 receive reserve signals from the secondary power supply 125, the controller 127 can disable all manual switches for as long as the secondary power supply 125 provides the reserve signals or for some period of time (e.g., 90 minutes) during which the secondary power supply 125 provides the reserve signals. As another example, if the primary power source 110 is out of service, and so one or more of the LV devices 180 receive reserve signals from the secondary power supply 125, the controller 127 can determine which particular LV devices 180 in the system 100 receive the reserve signals and/or which particular LV devices 180 in the system 100 do not receive the reserve signals.

In some cases, rather than being part of the secondary power supply 125, the controller 127 can be part of a PDM 120, another secondary power supply, an enterprise controller residing on an external server, and/or some other device in the system 100 and/or in another system coupled to the system 100. As yet another alternative, multiple controllers 127 can exist in a system and control a particular energy storage device 126 of a particular secondary power supply 125. In such a case, there can be a hierarchy among the multiple controllers 127, such that one controller 127 can override another controller under certain conditions. In any case, the controller 127 can control any technology used by the energy storage device 126 of a secondary power supply 125. More details about the controller 127 of the secondary power supply 125 can be found below with respect to FIG. 4.

If the secondary power supply 125 includes a power transfer device 128, the energy storage device 126 can be used for power that is fed into and/or generated by the power transfer device 128. In certain example embodiments, a secondary power supply 125 receives LV power (in addition to or in the alternative of line voltage power or some other form of power), stores the LV power as reserve power, and subsequently sends the reserve power (also called reserve signals) to one or more devices in the system.

The secondary power supply 125 can include one or more (e.g., one, two, five, ten) input channels 138 and one or more output channels 139, where each input channel 138 (also called an inlet channel) of the secondary power supply 125 receives one or more signals (also called input signals), and each output channel 139 (also called an outlet channel) of the secondary power supply 125 delivers one or more reserve signals. As an example, a signal delivered by the secondary power supply 125 can be reserve line voltage power that takes the place of the line voltage power delivered by the primary power source 110 when delivery of the line voltage power by the PDM 120 is interrupted. In such a case, the secondary power supply 125 can receive (directly or indirectly from the primary power source 110) and store line voltage power (an input signal) to generate the reserve line voltage power. As another example, a signal delivered by the secondary power supply 125 can be a control signal that controls the operation of one or more components (e.g., controller 190, one or more LV devices 180) of the system 100.

As yet another example, a signal delivered by the secondary power supply 125 can be a reserve LV signal that takes the place of the LV signal delivered by the PDM 120 when delivery of the LV signal by the PDM 120 is interrupted. In such a case, the secondary power supply 125 can receive and store the LV signal (an input signal) to generate the reserve LV signal. In this example, the secondary power supply 125 can deliver the reserve LV signal to the PDM 120 and/or to one or more of the LV devices 180. In the latter case, one or more LV devices 180 of the system (e.g., system 100, system 101) can be electrically coupled to one or more output channels 139 of the secondary power supply 125.

The amount and/or type of power of the reserve LV signal of one output channel 139 of the secondary power supply 125 can be substantially the same as, or different than, the amount and/or type of power of the reserve LV signal of another output channel 139 of the secondary power supply 125. For example, each output channel 139 of the secondary power supply 125 can output 100 W, 48 VDC of power (also called the LV signal). The reserve LV signals delivered by an output channel 139 of the secondary power supply 125 can be at a constant level and/or a variable level. The reserve LV signals can change a state (e.g., on, off, dim, standby) of one or more LV devices 180. In addition, or in the alternative, the reserve LV signal can include transfer of data (e.g., instructions, requests, information, status).

As yet another example, a secondary power supply 125 can include some of the capabilities (e.g., power transfer device) of the PDM 120. For instance, a secondary power supply 125 can receive and store line voltage power (an input signal) from a primary power source 110. When delivery of the line voltage power to the PDM 120 is interrupted, the secondary power supply 125 can apply its reserve line voltage power to an internal power transfer device 128, generating one or more reserve LV signals. In such a case, the secondary power supply 125 can send the reserve LV signals to the PDM 120, to a controller 190, and/or directly to one or more LV devices 180.

In certain example embodiments, one or more LV cables 104 and/or communication links 106 are used to electrically couple, directly or indirectly, one or more of the downstream LV devices 180 (e.g., the troffer lights 130, the can lights 150, the sensing device 140) in the system to the secondary power supply 125. The LV cables 104 can have one or more pairs of conductors. Each pair of conductors of the LV cable 104 (as described above) can deliver LV signals that represent power signals and/or communication signals. In addition, or in the alternative, the secondary power supply 125 can be coupled to one or more downstream devices using line voltage cable 102, a communication link 106, and/or any other communication device.

The secondary power supply 125 can also have a communication link 106 (as described above) that couples to one or more controllers 190. The secondary power supply 125 can be coupled to one or more other PDMs in one or more other systems. The system 100 and/or the system 101 can have multiple secondary power supplies 125, where each secondary power supply 125 provides reserve LV power (or some other type of power) and communicates (sends and receives data) with one or more downstream devices.

In certain example embodiments, each secondary power supply 125 can include communication and diagnostic capabilities (as described above). Communications can be with the controller 190, one or more other secondary power supplies 125, one or more primary power sources 110, one or more downstream LV devices 180, one or more PDMs 120, a user device, and/or any other component of the system 100 and/or the system 101 (or in another system coupled to the system 100 and/or the system 101).

The PDM 120, the controller 190, the secondary power supplies 125, and/or the POL controllers 109 of one or more LV devices 180 can include a hardware processor-based component that executes software instructions using integrated circuits, discrete components, and/or other mechanical and/or electronic architecture. In addition, or in the alternative, the PDM 120, a controller 190, the secondary power supply 125, and/or the POL controllers 109 of one or more LV devices 180 can include one or more of a number of non-hardware-based components. An example of such a non-hardware-based components can include one or more field programmable gate arrays (FPGA). Using FPGAs, integrated circuits, and/or other similar devices known in the art allows the PDM 120, a controller 190, the secondary power supply 125, and/or the POL controllers 109 of one or more LV devices 180 to be programmable and function according to certain logic rules and thresholds without the use, or with limited use, of a hardware processor.

The PDM 120 and/or the secondary power supply 125 can also have one or more of a number of other hardware and/or software components, including but not limited to a storage repository, memory, an application interface, and a security module. Such components of the secondary power supply 125 are described in more detail below with respect to FIG. 4. Similarly, the controller 190 and/or the POL controller 109 of one or more LV devices 180 in the system can include one or more software and/or hardware components, including but not limited to those listed above for the PDM 120 and one or more secondary power sources 125.

FIG. 2 shows a system diagram of another distributed low voltage power system 200 in accordance with certain example embodiments. Specifically, the system 200 of FIG. 2 is substantially the same as the system 100 of FIG. 1A, except that there are two secondary power supplies 225, secondary power supply 225A and secondary power supply 225B. In this case, the output of each secondary power supply 225 is directly coupled to a downstream device (one or more LV devices 280) rather than to the PDM 220. Specifically, the output of the secondary power supply 225A is coupled to the first in a series of troffer lights 230 and a photocell/timer 241, and the output of the secondary power supply 225B is coupled to the first in a series of sensing devices 240 and troffer lights 230.

Also, as shown in FIG. 2, the secondary power supplies receive line voltage power from a primary power source, convert the line voltage power to reserve LV power, and send the reserve LV power to the downstream devices to which they are coupled using LV cables 204. In this case, primary power source 210A delivers line voltage power to both the PDM 220 and the secondary power supply 225A, and primary power source 210C delivers line voltage power to secondary power supply 225B. Each secondary power supply 225 can store the line voltage power prior to converting the line voltage power to reserve LV power, and/or each secondary power supply 225 can convert the line voltage power to reserve LV power and subsequently store the reserve LV power prior to sending the reserve LV power to the downstream devices.

The PDM 220 can communicate with each secondary power supply 225 using one or more communication links 206. In this way, the PDM 220 can control one or more aspects of the operation of each secondary power supply 225 when the primary power source 210 is in service, and the secondary power supply 225 can control one or more aspects of the operation of one or more components (e.g., PDM 220, controller 290, LV devices 280) when the primary power source 210 is not in service. For example, the controller 227 of each of the secondary power supplies 225 in FIG. 2 can recognize that the power received from their respective primary power source 210 has been interrupted, and each controller 227 can use the LV links 204 and/or the communication links 206 release the reserve power stored in its respective energy storage device 226 so that reserve LV power can be delivered to the downstream devices.

Figure 3:
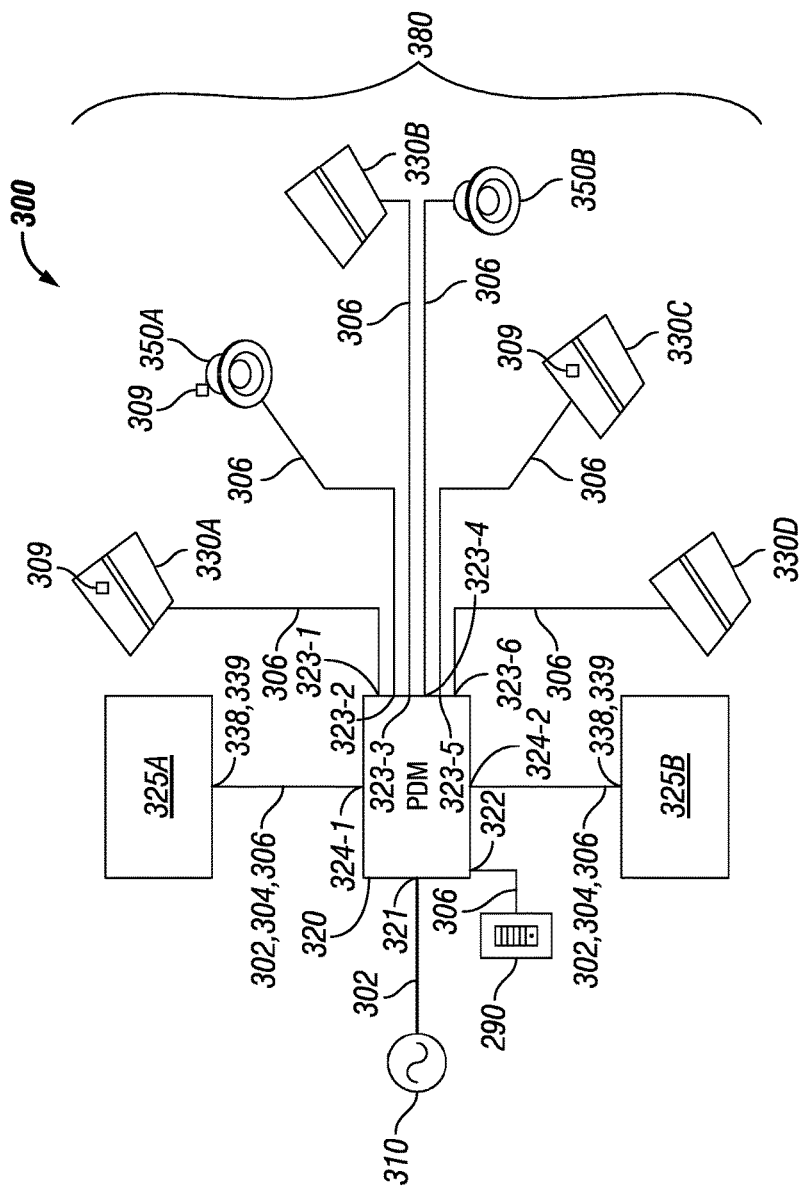
FIG. 3 shows another system diagram of another distributed low voltage power system in accordance with certain example embodiments.

FIG. 3 shows another system diagram of another distributed low voltage power system 300 in accordance with certain example embodiments. The system 300 of FIG. 3 (including its various components, such as the secondary power supplies 325) is substantially the same as the system 200 of FIG. 2, except as described below. In this case, the PDM 320 of FIG. 3 is a POE switch, also called a network switch. As such, only a single LV device 380 is coupled to an output channel 323 (e.g., output channel 323-1, output channel 323-3, output channel 323-6) of the PDM 320. Further, communication links 306 (e.g., Ethernet cables) rather than LV cables are used to couple an output channel 323 of the PDM 320 to a LV device 380. In some cases, multiple LV devices 380 can be coupled, in series and/or in parallel, with a single output channel 323 of the PDM 320.

In this case, troffer light 330A is coupled to output channel 323-1 of the PDM 320 using a communication link 306. Can light 350A is coupled to output channel 323-2 of the PDM 320 using a communication link 306. Troffer light 330B is coupled to output channel 323-3 of the PDM 320 using a communication link 306. Can light 350B is coupled to output channel 323-4 of the PDM 320 using a communication link 306. Troffer light 330C is coupled to output channel 323-5 of the PDM 320 using a communication link 306. Troffer light 330D is coupled to output channel 323-6 of the PDM 320 using a communication link 306.

Further, in this example, there is no direct coupling between the primary power source 310 and the two secondary power supplies 325 (in this case, secondary power supply 325A and secondary power supply 325B). Instead, the primary power source 310 sends the line voltage power to the PDM 320 through the line voltage cables 302. Once the line voltage power is received by the PDM 320, some of that line voltage power is used by the PDM 320 to generate the one or more LV signals. The rest of the line voltage power (as well as one or more other signals, such as communication signals) can be distributed to the secondary power supply 325A and/or the secondary power supply 325B using line voltage cables 302, LV cables 304, and/or communication links 306.

Alternatively, once the PDM 320 receives the line voltage power from the primary power source 310, the PDM 320 can send some other signal (e.g., a LV signal) to one or both of the secondary power supplies 325, which can be used by the secondary power supplies 325 to store and eventually generate reserve signals. In this example, there is also no direct link between the two secondary power supplies 325 and any of the LV devices 380. In such a case, as in this example, the controller 327 of one or more secondary power supplies 325 can control the PDM 320, overriding the controller of the PDM 320 during a second mode of operation (e.g., for as long as the primary power source 310 is not delivering power to the PDM 320, for some period of time during which the primary power source 310 is not delivering power to the PDM 320). As a result, the secondary power supply 325 can generate and send reserve LV signals to the LV devices 380 through the PDM 320 when delivery of the line voltage power from the primary power source 310 is interrupted.

Figure 4:
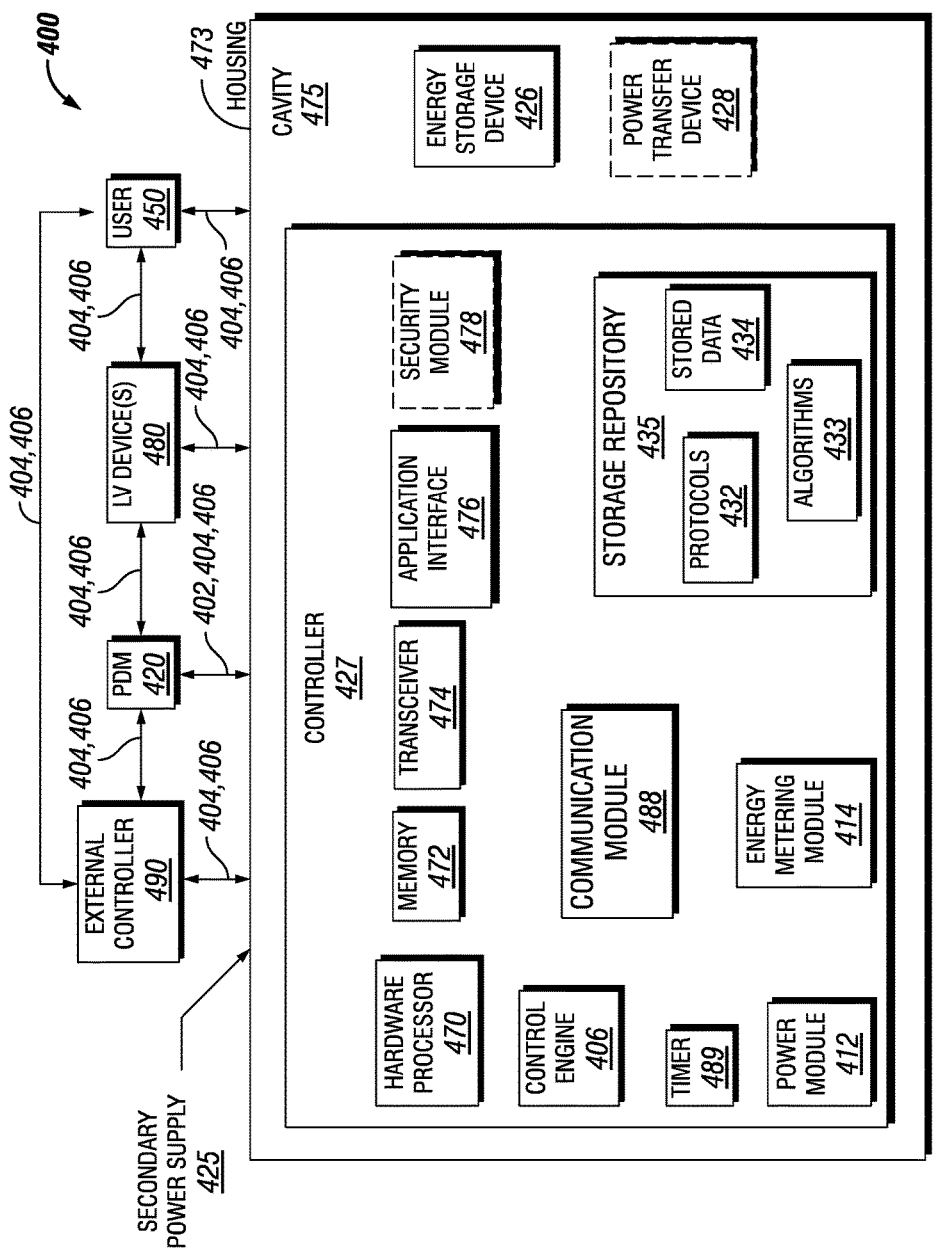
FIG. 4 shows a system diagram that includes a number of electrical devices in accordance with certain example embodiments.

FIG. 4 shows a system diagram of a system 400 in accordance with certain example embodiments. The system 400 of FIG. 4 includes a secondary power supply 425 having an example controller 427. The system 400 can also include a user 450, an external controller 490, a PDM 420, and at least one LV device 480. In addition to the controller 427, the secondary power supply 425 can include one or more of a number of other components, including but not limited to an energy storage device 426 and a power transfer device 428.

The controller 427 can include one or more of a number of components. Such components, can include, but are not limited to, an control engine 406, a communication module 488, a timer 489, an energy metering module 411, a power module 412, a storage repository 435, a hardware processor 470, a memory 472, a transceiver 474, an application interface 476, and, optionally, a security module 478. The components shown in FIG. 4 are not exhaustive, and in some embodiments, one or more of the components shown in FIG. 4 may not be included in an example controller. Any component of the example secondary power supply 425 can be discrete or combined with one or more other components of the secondary power supply 425.

As described herein, a user 450 can be any person that interacts with example secondary power supplies. Examples of a user 450 may include, but are not limited to, an engineer, an electrician, an instrumentation and controls technician, an instrumentation and controls technician, a mechanic, an operator, a consultant, an inventory management system, an inventory manager, a foreman, a labor scheduling system, a contractor, and a manufacturer's representative. The user 450 can use a user system (not shown), which may include a display (e.g., a GUI). The user 450 interacts with (e.g., sends data to, receives data from) the controller 427 of the secondary power supply 425 via the application interface 476 (described below). The user 450 can also interact with an external controller 490, the PDM 420, and/or one or more of the LV devices 480 in the system 400.

Interaction (e.g., LV signals, reserve LV signals, control signals) between the user 450, secondary power supply 425 (or components thereof, such as the controller 427), the external controller 490, the PDM 420, and/or one or more of the LV devices 480 can be conducted using LV links 404 and/or communication links 406. As discussed above, each LV link 404 and each communication link 406 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, WirelessHART, ISA100) technology. For example, a communication link 406 can be (or include) one or more electrical conductors that are coupled to the housing 473 of a secondary power supply 425. The communication link 406 can transmit signals (e.g., reserve LV signals, communication signals, control signals, data) between the secondary power supply 425 and one or more LV devices 480, the PDM 420, the user 450, and/or the external controller 490.

The external controller 490 is a device or component that controls all or a portion of a communication network that can include the controller 427 of the secondary power supply 425, the PDM 420, one or more POL controllers, and/or one or more LV devices 480 that are communicably coupled to the controller 427. The external controller 490 can be substantially similar to the controller 427. Alternatively, the external controller 490 can include one or more of a number of features in addition to, or altered from, the features of the controller 427 described below. As described herein, communication with the external controller 490 can include communicating with one or more other components (e.g., another secondary power supply 425) of the system 400. In such a case, the external controller 490 can facilitate such communication.

The user 450, the external controller 490, the PDM 420, and/or one or more of the LV devices 480 (including any associated POL controllers) can interact with the controller 427 of the secondary power supply 425 using the application interface 476 in accordance with one or more example embodiments. Specifically, the application interface 476 of the controller 427 receives data (e.g., information, communications, instructions, updates to firmware) from and sends data (e.g., information, communications, instructions) to the user 450, the external controller 490, and/or each other secondary power supply 425. The user 450, the external controller 490, and/or each other secondary power supply 425 can include an interface to receive data from and send data to the controller 427 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 427, the user 450, the external controller 490, the PDM 420, and/or the LV devices 480 (including any associated POL controllers) can use their own system or share a system in certain example embodiments. Such a system can be, or contain a form of, an Internet-based or an intranet-based computer system that is capable of communicating with various software. A computer system includes any type of computing device and/or communication device, including but not limited to the controller 427. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 5.

Further, as discussed above, such a system can have corresponding software (e.g., user software, PDM system software, network manager software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100. The secondary power supply 425 can include a housing 473. The housing 473 can include at least one wall that forms a cavity 475. In some cases, the housing 473 can be designed to comply with any applicable standards so that the secondary power supply 425 can be located in a particular environment (e.g., a hazardous environment, a harsh environment).

The housing 473 of the secondary power supply 425 can be used to house one or more components of the secondary power supply 425, including one or more components of the controller 427. For example, as shown in FIG. 4, the controller 427 (which in this case includes the control engine 406, the communication module 488, the timer 489, the energy metering module 411, the power module 412, the storage repository 435, the hardware processor 470, the memory 472, the transceiver 474, the application interface 476, and the optional security module 478), the energy storage device 426, and the power transfer device 428 are disposed in the cavity 475 formed by the housing 473. In alternative embodiments, any one or more of these or other components of the secondary power supply 425 can be disposed on the housing 473 and/or remotely from the housing 473.

The storage repository 435 can be a persistent storage device (or set of devices) that stores software and data used to assist the controller 427 in communicating with the user 450, the external controller 490, the PDM 420, and one or more of the LV devices (including any associated POL controllers) within the system 400. In one or more example embodiments, the storage repository 435 stores one or more protocols 432, algorithms 433, and stored data 434. The protocols 432 can include any of a number of communication protocols that are used to send and/or receive data between the controller 427 and the user 450, the external controller 490, the PDM 420, and/or one or more of the LV devices 480. A protocol 432 can also include one or more processes for providing reserve power and/or control during a second mode of operation. One or more of the protocols 432 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 432 can provide a layer of security to the data transferred within the system 400.

The algorithms 433 can be any procedures (e.g., a series of method steps), formulas, logic steps, mathematical models, and/or other similar operational procedures that the control engine 406 of the controller 427 follows based on certain conditions at a point in time. An example of an algorithm 433 is determining when a second mode of operation has begun, sending reserve power to one or more other components (e.g., PDM 420, LV devices 480) in the system 400, and sending control signals (e.g., to the PDM 420) to prevent certain LV devices 480 from receiving reserve power and/or to override controls of certain LV devices 480.

Algorithms 433 can be focused on the secondary power supply 425 providing reserve power and/or control during a second mode of operation. An algorithm 433 can be fixed or modified (e.g., by a user 450, by the control engine 406) over time. Modification of an algorithm 433 can be based on one or more of a number of factors, including but not limited to new equipment (e.g., a new transceiver 474) and correction based on actual data.

Stored data 434 can be any data (e.g., processing speed) associated with the secondary power supply 425, measurements taken by the energy metering module 411, threshold values, results of previously run or calculated algorithms, and/or any other suitable data. Such data can be any type of data, including but not limited to historical data for the secondary power supply 425, historical data for the PDM 420, calculations, an identification number of a secondary power supply 425, and measurements taken by the energy metering module 411. The stored data 434 can be associated with some measurement of time derived, for example, from the timer 489.

Examples of a storage repository 435 can include, but are not limited to, a database (or a number of databases), a file system, a hard drive, flash memory, some other form of solid state data storage, or any suitable combination thereof. The storage repository 435 can be located on multiple physical machines, each storing all or a portion of the protocols 432, the algorithms 433, and/or the stored data 434 according to some example embodiments. Each storage unit or device can be physically located in the same or in a different geographic location.

The storage repository 435 can be operatively connected to the control engine 406. In one or more example embodiments, the control engine 406 includes functionality to communicate with the user 450, the PDM 420, one or more LV devices 480, one or more POL controllers, and an external controller 490 in the system 100. More specifically, the control engine 406 sends information to and/or receives information from the storage repository 435 in order to communicate with the user 450, the PDM 420, one or more LV devices 480, one or more POL controllers, and an external controller 490. As discussed below, the storage repository 435 can also be operatively connected to the communication module 488 in certain example embodiments.

In certain example embodiments, the control engine 406 of the controller 427 controls the operation of one or more components (e.g., the communication module 488, the timer 489, the transceiver 474) of the controller 427. For example, the control engine 406 can activate the communication module 488 when the communication module 488 is in "sleep" mode and when the communication module 488 is needed to send data received from another component (e.g., another secondary power supply 425, the user 450) in the system 100.

As another example, the control engine 406 can acquire the current time using the timer 489. The timer 489 can enable the controller 427 to control the secondary power supply 425 even when the controller 427 has no communication with the external controller 490. As yet another example, the control engine 406 can direct the energy metering module 411 to measure and send power consumption information of the secondary power supply 425 to the external controller 490. In certain example embodiments, the timer 489 can track the amount of time since a second mode of operation began. In such a case, the control engine 406 can cease the flow of reserve power from the secondary power supply 425 to the PDM 420 and/or the LV devices 480 once a certain amount of time (e.g., 45 minutes, 90 minutes) has lapsed since the second mode of operation began, even if power from the primary power source is still interrupted. Alternatively, the control engine 406 can send one or more control signals to another device (e.g., the PDM 420, a POL controller) to cease the flow of reserve power from such other device in the system 400.

The control engine 406 can be configured to perform a number of functions that help the secondary power supply 425 (or components thereof) supply reserve signals (e.g., reserve LV signals, control signals) to the PDM 420, one or more LV devices 480 (including any associated POL controllers), and/or an external controller 490 during a second mode of operation. As discussed above, the control engine 406 can execute any of the algorithms 433 stored in the storage repository 435. In certain example embodiments, the control engine 406 controls the frequency at which a signal is sent to another secondary power supply 425 in the system 400.

The control engine 406 can provide control, communication, and/or other similar signals to the user 450, the external controller 490, the PDM 420, and/or one or more of the LV devices 480 (including any associated POL controllers). Similarly, the control engine 406 can receive control, communication, and/or other similar signals from the user 450, the external controller 490, the PDM 420, and/or one or more of the LV devices 480 (including any associated POL controllers). The control engine 406 may include a printed circuit board, upon which the hardware processor 470 and/or one or more discrete components of the controller 427 are positioned. In certain embodiments, the control engine 406 of the controller 427 can communicate with one or more components of a system external to the system 400 in furtherance of the secondary power supply 425 providing power and/or control during a second mode of operation.

In certain example embodiments, the control engine 406 can include an interface that enables the control engine 406 to communicate with one or more components (e.g., the energy storage device 426, the power transfer device 428) of the secondary power supply 425. For example, if the energy storage device 426 and/or the power transfer device 428 of the secondary power supply 425 operates under IEC Standard 62386, then the energy storage device 426 and/or the power transfer device 428 can have a serial communication interface that will transfer data (e.g., stored data 434). In such a case, the control engine 406 can also include a serial interface to enable communication with the energy storage device 426 and/or the power transfer device 428 within the secondary power supply 425. Such an interface can operate in conjunction with, or independently of, the protocols 432 used to communicate between the controller 427 and the user 450, the external controller 490, the PDM 420, and one or more of the LV devices (including any associated POL controllers).

The control engine 406 (or other components of the controller 427) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I²C), and a pulse width modulator (PWM).

The communication module 488 of the controller 427 determines and implements the communication protocol (e.g., from the protocols 432 of the storage repository 435) that is used when the control engine 406 communicates with (e.g., sends signals to, receives signals from) the user 450, the external controller 490, the PDM 420, and/or one or more of the LV devices (including any associated POL controllers). In some cases, the communication module 488 accesses the stored data 434 to determine which communication protocol is used to communicate with the other secondary power supply 425 associated with the stored data 434. In addition, the communication module 488 can interpret the communication protocol of a communication received by the controller 427 so that the control engine 406 can interpret the communication.

The communication module 488 can send and receive data between the external controller 490, the PDM 420, one or more LV devices 480 (including any associated POL controllers), and/or the users 450 and the controller 427. The communication module 488 can send and/or receive data in a given format that follows a particular protocol 432. The control engine 406 can interpret the data packet received from the communication module 488 using the protocol 432 information stored in the storage repository 435. The control engine 406 can also facilitate the data transfer between the external controller 490, the PDM 420, one or more LV devices 480 (including any associated POL controllers), and/or a user 450 by converting the data into a format understood by the communication module 488.

The communication module 488 can send data (e.g., protocols 432, algorithms 433, stored data 434, operational information, alarms) directly to and/or retrieve data directly from the storage repository 435. Alternatively, the control engine 406 can facilitate the transfer of data between the communication module 488 and the storage repository 435. The communication module 488 can also provide encryption to data that is sent by the controller 427 and decryption to data that is received by the controller 427. The communication module 488 can also provide one or more of a number of other services with respect to data sent from and received by the controller 427. Such services can include, but are not limited to, data packet routing information and procedures to follow in the event of data interruption.

The timer 489 of the controller 427 can track clock time, intervals of time, an amount of time, and/or any other measure of time. The timer 489 can also count the number of occurrences of an event, whether with or without respect to time. Alternatively, the control engine 406 can perform the counting function. The timer 489 is able to track multiple time measurements concurrently. The timer 489 can track time periods based on an instruction received from the control engine 406, based on an instruction received from the user 450, based on an instruction programmed in the software for the controller 427, based on some other condition or from some other component, or from any combination thereof.

The timer 489 can be configured to track time when there is no power delivered to the controller 427 (e.g., the power module 412 malfunctions) using, for example, a super capacitor or a battery backup. In such a case, when there is a resumption of power delivery to the controller 427, the timer 489 can communicate any aspect of time to the controller 427. In such a case, the timer 489 can include one or more of a number of components (e.g., a super capacitor, an integrated circuit) to perform these functions.

The energy metering module 411 of the controller 427 measures one or more components of power (e.g., current, voltage, resistance, VARs, watts) associated with the secondary power supply 425 at one or more points in the system 400. The energy metering module 411 can include any of a number of measuring devices and related devices, including but not limited to a voltmeter, an ammeter, a power meter, an ohmmeter, a current transformer, a potential transformer, and electrical wiring. The energy metering module 411 can measure a component of power continuously, periodically, based on the occurrence of an event, based on a command received from the control engine 406, and/or based on some other factor.

The power module 412 of the controller 427 provides power to one or more other components (e.g., timer 489, control engine 406) of the controller 427. In addition, in certain example embodiments, the power module 412 can provide power to the energy storage device 426 of the secondary power supply 425. The power module 412 can include one or more of a number of single or multiple discrete components (e.g., transistor, diode, resistor), and/or a microprocessor. The power module 412 may include a printed circuit board, upon which the microprocessor and/or one or more discrete components are positioned. In some cases, the power module 412 can include one or more components that allow the power module 412 to measure one or more elements of power (e.g., voltage, current) that is delivered to and/or sent from the power module 412, Alternatively, the controller 427 can include a power metering module (not shown) to measure one or more elements of power that flows into, out of, and/or within the controller 427.

The power module 412 can include one or more components (e.g., a transformer, a diode bridge, an inverter, a converter) that receives power (for example, through an electrical cable) from a source external to the secondary power supply 425 and generates power of a type (e.g., alternating current, direct current) and level (e.g., 12V, 24V, 470V) that can be used by the other components of the controller 427. The power module 412 can use a closed control loop to maintain a preconfigured voltage or current with a tight tolerance at the output. The power module 412 can also protect the rest of the electronics (e.g., hardware processor 470, transceiver 474) in the secondary power supply 425 from surges generated in the line. In addition, or in the alternative, the power module 412 can be a source of power in itself to provide signals to the other components of the controller 427. For example, the power module 412 can be a battery. As another example, the power module 412 can be a localized photovoltaic power system.

The hardware processor 470 of the controller 427 executes software, algorithms, and firmware in accordance with one or more example embodiments. Specifically, the hardware processor 470 can execute software on the control engine 406 or any other portion of the controller 427, as well as software used by the user 450, the external controller 490, the PDM, one or more POL controllers, and/or one or more LV devices 480. The hardware processor 470 can be an integrated circuit, a central processing unit, a multi-core processing chip, SoC, a multi-chip module including multiple multi-core processing chips, or other hardware processor in one or more example embodiments. The hardware processor 470 is known by other names, including but not limited to a computer processor, a microprocessor, and a multi-core processor.

In one or more example embodiments, the hardware processor 470 executes software instructions stored in memory 472. The memory 472 includes one or more cache memories, main memory, and/or any other suitable type of memory. The memory 472 can include volatile and/or non-volatile memory. The memory 472 is discretely located within the controller 427 relative to the hardware processor 470 according to some example embodiments. In certain configurations, the memory 472 can be integrated with the hardware processor 470.

In certain example embodiments, the controller 427 does not include a hardware processor 470. In such a case, the controller 427 can include, as an example, one or more field programmable gate arrays (FPGA). Using FPGAs and/or other similar devices known in the art allows the controller 427 (or portions thereof) to be programmable and function according to certain logic rules and thresholds without the use of a hardware processor. Alternatively, FPGAs and/or similar devices can be used in conjunction with one or more hardware processors 470.

The transceiver 474 of the controller 427 can send and/or receive control and/or communication signals. Specifically, the transceiver 474 can be used to transfer data between the controller 427 and the user 450, the external controller 490, the PDM 420, and/or one or more LV devices 480 (including any associated POL controllers). The transceiver 474 can use wired and/or wireless technology. The transceiver 474 can be configured in such a way that the control and/or communication signals sent and/or received by the transceiver 474 can be received and/or sent by another transceiver that is part of the user 450, the external controller 490, the external controller 490, the PDM, one or more POL controllers, and/or one or more LV devices 480. The transceiver 474 can use any of a number of signal types, including but not limited to radio frequency signals.

When the transceiver 474 uses wireless technology, any type of wireless technology can be used by the transceiver 474 in sending and receiving signals. Such wireless technology can include, but is not limited to, Wi-Fi, visible light communication, cellular networking, and Bluetooth. The transceiver 474 can use one or more of any number of suitable communication protocols (e.g., ISA100, HART) when sending and/or receiving signals. Such communication protocols can be stored in the protocols 432 of the storage repository 435. Further, any transceiver information for the user 450, and/or the external controller 490 can be part of the stored data 434 (or similar areas) of the storage repository 435.

Optionally, in one or more example embodiments, the security module 478 secures interactions between the controller 427, the user 450, the external controller 490, the PDM, one or more POL controllers, and/or one or more LV devices 480. More specifically, the security module 478 authenticates communication from software based on security keys verifying the identity of the source of the communication. For example, user software may be associated with a security key enabling the software of the user 450 to interact with the controller 427. Further, the security module 478 can restrict receipt of information, requests for information, and/or access to information in some example embodiments.

The energy storage device 426 can be substantially the same as the energy storage device 126 described above with respect to FIG. 1. The energy storage device 426 of the secondary power supply 425 can provide power to one or more components of the secondary power supply 425. In this way, the energy storage device 426 (or portions thereof) can be substantially the same as, or different than, the power module 412 of the controller 427. The energy storage device 426 can include one or more of a number of single or multiple discrete components (e.g., transistor, diode, resistor), and/or a microprocessor. The energy storage device 426 may include a printed circuit board upon which the microprocessor and/or one or more discrete components are positioned.

The power transfer device 428 can be substantially the same as the power transfer device 128 described above with respect to FIG. 1. For example, the power transfer device 428 can include one or more components (e.g., a transformer, a diode bridge, an inverter, a converter) that receives reserve power (for example, through an electrical cable) from the energy storage device 426 and generates power of a type (e.g., alternating current, direct current) and level (e.g., 12V, 24V, 470V) that can be used by one or more components (e.g., the PDM 420, a POL controller) of the system 400. In addition, or in the alternative, the power transfer device 428 can receive power from a source external to the secondary power supply 425 and convert that power into a type and level that can be stored in the energy storage device 426.

As stated above, one or more example secondary power supplies 425 can be placed in any of a number of environments. In such a case, the housing 473 of the secondary power supply 425 can be configured to comply with applicable standards for any of a number of environments. For example, the secondary power supply 425 can be rated as a Division 1 or a Division 2 enclosure under NEC standards. Similarly, any other devices communicably coupled to the secondary power supply 425 can be configured to comply with applicable standards for any of a number of environments.

Figure 5:
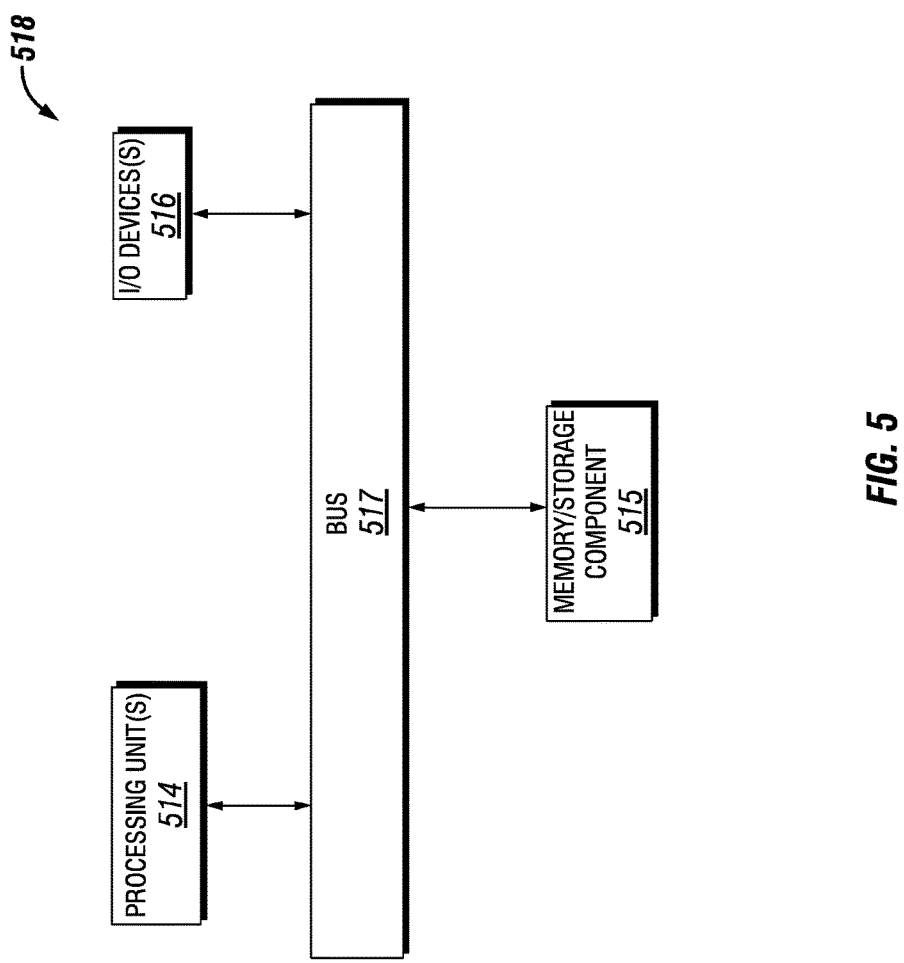
FIG. 5 shows a computing device in accordance with certain example embodiments.

FIG. 5 illustrates one embodiment of a computing device 518 that implements one or more of the various techniques described herein, and which is representative, in whole or in part, of the elements described herein pursuant to certain exemplary embodiments. Computing device 518 is one example of a computing device and is not intended to suggest any limitation as to scope of use or functionality of the computing device and/or its possible architectures. Neither should computing device 518 be interpreted as having any dependency or requirement relating to any one or combination of components illustrated in the example computing device 518.

Computing device 518 includes one or more processors or processing units 514, one or more memory/storage components 515, one or more input/output (I/O) devices 516, and a bus 517 that allows the various components and devices to communicate with one another. Bus 517 represents one or more of any of several types of bus structures, including a memory bus or memory controller, a peripheral bus, an accelerated graphics port, and a processor or local bus using any of a variety of bus architectures. Bus 517 includes wired and/or wireless buses.

Memory/storage component 515 represents one or more computer storage media. Memory/storage component 515 includes volatile media (such as random access memory (RAM)) and/or nonvolatile media (such as read only memory (ROM), flash memory, optical disks, magnetic disks, and so forth). Memory/storage component 515 includes fixed media (e.g., RAM, ROM, a fixed hard drive, etc.) as well as removable media (e.g., a Flash memory drive, a removable hard drive, an optical disk, and so forth).

One or more I/O devices 516 allow a customer, utility, or other user to enter commands and information to computing device 518, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 518 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 518 includes at least the minimal processing, input, and/or output means necessary to practice one or more embodiments.

Further, those skilled in the art will appreciate that one or more elements of the aforementioned computer device 518 is located at a remote location and connected to the other elements over a network in certain exemplary embodiments. Further, one or more embodiments is implemented on a distributed system having one or more nodes, where each portion of the implementation (e.g., control engine 406) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 6:
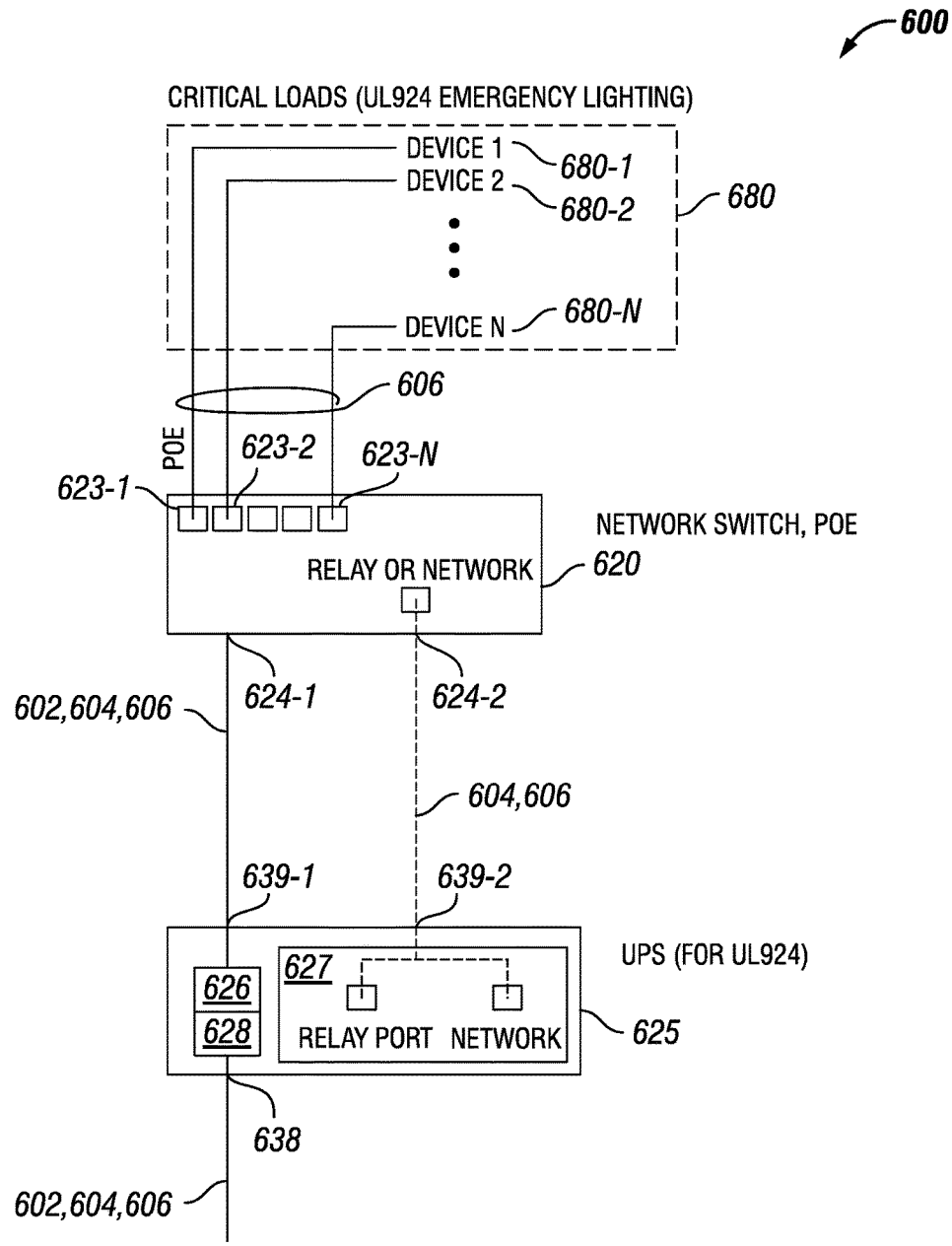
FIG. 6 shows a system that includes a UPS with control capabilities in accordance with certain example embodiments.

FIG. 6 shows a system 600 that includes a UPS 625 with control capabilities in accordance with certain example embodiments. In this case, the UPS 625, acting as a secondary power supply in the system 600, provides reserve power (e.g., reserve LV signals) to the PDM 620 (acting as a POE switch, as with the system 300 of FIG. 3 above) using line voltage cables 602, LV links 604, and/or communication links 606 when power from the primary power source (not shown in FIG. 6) is interrupted.

The reserve power delivered by the UPS 625 to the PDM 620 sent from output channel 639-1 of the UPS 625 to input channel 624-1 of the PDM 620 using one or more line voltage cables 602, LV links 604, and/or communication links 606. The reserve power (also called reserve LV signals or reserve signals) can, in turn, be sent from one or more output channels 623 (e.g., output channel 623-1, output channel 623-2, output channel 623-N) of the PDM 620 to one or more of the LV devices 680 (e.g., LV device 680-1, LV device 680-2, LV device 680-N) using one or more communication links 606. In this case, since the PDM 620 acts as a POE switch, only one LV device 680 is coupled to a single output channel 623 of the PDM 620.

When the PDM 620 receives the reserve power from the UPS 625, the PDM 620 can deliver the reserve power, unaltered, to the LV devices 680. In such a case, the UPS 625 can include an energy transfer device 628, which receives the raw reserve power stored in the energy storage device 626 of the UPS 625 and manipulates (e.g., inverts, converts, transforms) the raw reserve power into final reserve power, which is at a level and type that is used by each of the LV devices 680. Alternatively, when the PDM 620 receives the raw reserve power from the UPS 625, the PDM 620 can manipulate the raw reserve power into final reserve power, which is then delivered to each of the LV devices 680.

The UPS 625 can also send one or more control signals, generated by the controller 627 of the UPS 625, from output channel 639-2 of the UPS 625 to input channel 624-2 of the PDM 620 using one or more LV links 604 and/or communication links 606. Such control signals can override any control or certain controls of the PDM 620 (or, in some cases, external controls, such as, for example, light switches, dimming controls, and thermostats) over the LV devices 680 during a second mode of operation (when delivery of power from the primary power source is interrupted and the UPS 625 provides reserve power). In some cases, such control signals override any control or certain controls of the PDM 620 and/or external control devices when both the primary power source is interrupted and the UPS 625 is no longer delivering reserve power (e.g., because the energy storage device 626 is depleted, because the UPS 625 has provided reserve power for a certain period of time).

Figure 7:
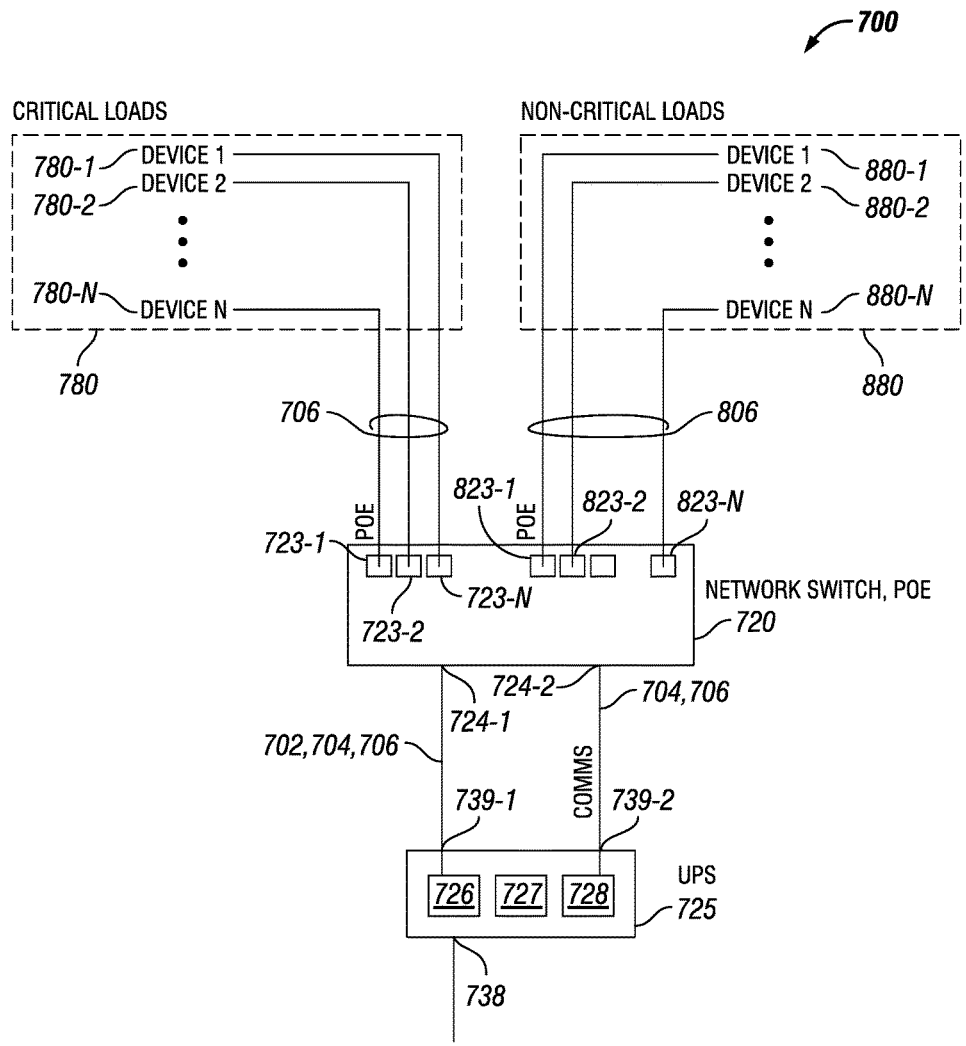
FIG. 7 shows another system that includes a UPS with control capabilities in accordance with certain example embodiments.

FIG. 7 shows another system 700 that includes a UPS 725 with control capabilities in accordance with certain example embodiments. In this case, the UPS 725, acting as a secondary power supply in the system 700, provides reserve power (e.g., reserve LV signals) to the PDM 720 (acting as a POE switch, as with the system 300 of FIG. 3 above) using line voltage cables 702, LV links 704, and/or communication links 706 when power from the primary power source (not shown in FIG. 7) is interrupted (during a second mode of operation).

The reserve power delivered by the UPS 725 to the PDM 720 sent from output channel 739-1 of the UPS 725 to input channel 724-1 of the PDM 720 using one or more line voltage cables 702, LV links 704, and/or communication links 706. The reserve power (also called reserve LV signals or reserve signals) can, in turn, be sent from one or more output channels 723 (e.g., output channel 723-1, output channel 723-2, output channel 723-N) of the PDM 720 to one or more of the LV devices 780 (e.g., LV device 780-1, LV device 780-2, LV device 780-N) and/or from one or more output channels 823 (e.g., output channel 823-1, output channel 823-2, output channel 823-N) of the PDM 720 to one or more of the LV devices 880 (e.g., LV device 880-1, LV device 880-2, LV device 880-N) using one or more communication links 806. In this case, since the PDM 720 acts as a POE switch, only one LV device 780 is coupled to a single output channel 723 of the PDM 720, and only one LV device 880 is coupled to a single output channel 823 of the PDM 720.

When the PDM 720 receives the reserve power from the UPS 725, the PDM 720 can deliver the reserve power, unaltered, to the LV devices 780. In such a case, the UPS 725 can include an energy transfer device 728, which receives the raw reserve power stored in the energy storage device 726 of the UPS 725 and manipulates (e.g., inverts, converts, transforms) the raw reserve power into final reserve power, which is at a level and type that is used by each of the LV devices 780. Alternatively, when the PDM 720 receives the raw reserve power from the UPS 725, the PDM 720 can manipulate the raw reserve power into final reserve power, which is then delivered to each of the LV devices 780.

The UPS 725 can also send one or more control signals, generated by the controller 727 of the UPS 725, from output channel 739-2 of the UPS 725 to input channel 724-2 of the PDM 720 using one or more LV links 704 and/or communication links 706. Such control signals can instruct the PDM 620 to deliver the reserve power to LV devices 780 and to not deliver the reserve power to the LV devices 880 during a second mode of operation (when delivery of power from the primary power source is interrupted). In some cases, such control signals can remain in effect when both the primary power source is interrupted and the UPS 725 is no longer delivering reserve power (e.g., because the energy storage device 726 is depleted, because the UPS 725 has provided reserve power for a certain period of time). During a first mode of operation, when power is being delivered by the primary power source, the LV devices 780 and the LV devices 880 are treated the same by the PDM 720.

Example embodiments provide a number of benefits. Examples of such benefits include, but are not limited to, compliance with applicable standards and/or regulations, reduction in energy usage; simplistic integration into existing systems lacking a secondary power source, simplified maintenance; qualification as a Class 2 device and/or system; less need for licensed electricians; reduced downtime of equipment; lower maintenance costs; prognosis of equipment failure; improved maintenance planning; and reduced cost of labor and materials. Example embodiments can also be integrated (e.g., retrofitted) with existing systems.

Example embodiments are electrically safe. Example systems or any portion thereof can be free from risk (or a greatly reduced risk) of fire or electrical shock for any user installing, using, replacing, and/or maintaining any portion of example embodiments. For example, the LV signals that feed a device can allow a user to maintain the device without fear of fire or electrical shock. While Class 2 systems and SELV/PELV/FELV are described above, example embodiments can comply with one or more of a number of similar standards and/or regulations throughout the world. Example embodiments can be used to implement intelligent predictive load management strategies.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A distributed low voltage power system, comprising:
   a primary power source that distributes line voltage power during a first mode of operation and fails to distribute the line voltage power during a second mode of operation;
   a secondary power supply coupled to the primary power source, wherein the secondary power supply comprises a controller and an energy storage device, wherein the controller receives the line voltage power during the first mode of operation, stores the line voltage power as reserve power in the energy storage device during the first mode of operation, and distributes the reserve power during the second mode of operation;
   a power distribution module (PDM) coupled to the primary power source and the secondary power supply, wherein the PDM comprises a first power transfer device and a first output channel, wherein the PDM receives the line voltage power from the primary power source during the first mode of operation, and wherein the first power transfer device generates a first low-voltage (LV) signal using the line voltage power during the first mode of operation; and
   at least one first LV device coupled to the first output channel of the PDM, wherein the at least one LV device operates using the first LV signal generated by the PDM during the first mode of operation, and wherein the at least one first LV device operates using a reserve LV signal based on the reserve power during the second mode of operation,
   wherein the LV signal is up to 100 VAC or up to 60 VDC.

2. The distributed low voltage power system of claim 1, wherein the PDM is a Power-Over-Ethernet (POE) switch, and wherein the secondary power supply is an uninterruptible power supply (UPS).

3. The distributed low voltage power system of claim 2, wherein the first output channel of the PDM is among a plurality of output channels, wherein the at least one first LV device is among a plurality of LV devices, wherein the plurality of output channels is coupled to the plurality of LV devices using a plurality of first communication links.

4. The distributed low voltage power system of claim 3, wherein the controller of the secondary power supply overrides manual control of the PDM during the second mode of operation.

5. The distributed low voltage power system of claim 4, wherein the controller of the secondary power supply overrides manual control of the PDM using signals sent using at least one selected from a group consisting of a second communication link and a LV link between the secondary power supply and the PDM.

6. The distributed low voltage power system of claim 3, wherein the plurality of LV devices comprises at least one critical device and at least one non-critical device, wherein the controller of the secondary power supply controls the PDM to deliver the reserve LV signal to the at least one critical device during the second mode of operation, and wherein the controller of the secondary power supply controls the PDM to stop delivery of the reserve LV signal to the at least one non-critical device during the second mode of operation.

7. The distributed low voltage power system of claim 3, wherein the secondary power supply further comprises a second power transfer device.

8. The distributed low voltage power system of claim 7, wherein the plurality of LV devices comprises at least one critical device and at least one non-critical device, wherein the controller of the secondary power supply delivers the reserve LV signal, using the second power transfer device, to the at least one critical device during the second mode of operation, and wherein the controller of the secondary power supply fails to deliver the reserve LV signal to the at least one non-critical device during the second mode of operation.

9. The distributed low voltage power system of claim 1, wherein the line voltage power is the line voltage power distributed by the primary power source, and wherein the reserve power is reserve primary power delivered by the secondary power supply to the power transfer device of the PDM, and wherein the line voltage power is received by the secondary power supply directly from the primary power source.

10. The distributed low voltage power system of claim 1, wherein the line voltage power is the line voltage power distributed by the first primary power source, and wherein the reserve power is reserve primary power delivered by the secondary power source to the power transfer device of the PDM, and wherein the line voltage power is received by the first secondary power source directly from the PDM.

11. The distributed low voltage power system of claim 1, wherein the line voltage power is the line voltage power distributed by the first primary power source, and wherein the reserve power is the reserve LV signal generated by an alternative power transfer device of the secondary power source using the line voltage power, and wherein the reserve LV signal is received by the at least one LV device directly from the PDM.

12. The distributed low voltage power system of claim 1, wherein the controller of the secondary power supply determines when to begin the second mode of operation, and wherein the controller of the secondary power supply sends control signals to the PDM to control operation of the PDM during the second mode of operation.

13. The distributed low voltage power system of claim 1, wherein the first LV signal is direct current power.

14. The distributed low voltage power system of claim 1, wherein the at least one first LV device qualifies as a Class 2 device.

15. A secondary power source, comprising:
at least one input channel configured to receive input power from a power source;
an energy storage device coupled to the at least one input channel, wherein the energy storage device stores the input power, wherein the energy storage device converts the input power to reserve power;
at least one output channel that receives, during a first mode of operation, the reserve power from the energy storage device, wherein the at least one output channel is configured to deliver the reserve power to at least one component of a low voltage (LV) power distribution system; and
a controller that controls the flow of the input power from the at least one input channel to the energy storage device and the flow of the reserve power from the energy storage device to the at least one output channel, wherein the controller is configured to autonomously control delivery of the reserve power to at least one LV device when the input power ceases being delivered to the at least one input channel, wherein the delivery of the reserve power is autonomous relative to control of the input power delivered to the at least one LV device during a second mode of operation that is independent of the first mode of operation.

16. The secondary power source of claim 15, further comprising:
a power transfer device electrically coupled to and disposed between the energy storage device and the at least one output channel, wherein the power transfer device is configured to generate a reserve LV signal based on the reserve power.

17. The secondary power source of claim 16, wherein controlling the delivery of the reserve power comprises determining which selected LV devices of a plurality of LV devices receive the reserve LV signal when the input power ceases being delivered to the at least one input channel.

18. The secondary power source of claim 17, wherein the reserve LV signal is delivered directly from the at least one output channel to the selected LV devices.

19. The secondary power source of claim 17, wherein the reserve LV signal is delivered directly from the at least one output channel to a power distribution module (PDM), wherein the PDM delivers the reserve LV signal to the selected LV devices.

20. The secondary power source of claim 15, wherein controlling the delivery of the reserve power comprises instructing a Power-Over-Ethernet (POE) switch to disable control over at least one LV device of a plurality of LV devices when the input power ceases being delivered to the at least one input channel.

* * * * *